United States Patent [19]

Jonker et al.

[11] 4,196,991
[45] Apr. 8, 1980

[54] MULTI-IMAGE FILM CASSETTE HOLDER WITH AUTOMATIC POSITIONING

[75] Inventors: Roelof R. Jonker, Westminster; Dennis A. Webb, Culver City, both of Calif.

[73] Assignee: Nise, Inc., Cerritos, Calif.

[21] Appl. No.: 903,529

[22] Filed: May 8, 1978

[51] Int. Cl.² .................... G03B 41/16; G03B 1/00
[52] U.S. Cl. .................................... 354/124; 250/471
[58] Field of Search ................. 354/76, 110, 120, 123, 354/124; 355/53, 54, 74; 250/468, 471

[56] References Cited

U.S. PATENT DOCUMENTS

| | | | |
|---|---|---|---|
| 1,892,683 | 1/1933 | Robertson | 354/123 X |
| 2,369,980 | 2/1945 | Reyniers | 354/123 X |
| 3,618,497 | 11/1971 | Ataka | 354/123 |
| 4,027,315 | 5/1977 | Barney | 354/76 |
| 4,089,019 | 5/1978 | Jonker | 354/124 |
| 4,105,920 | 8/1978 | Pury et al. | 250/471 X |

*Primary Examiner*—Donald A. Griffin
*Attorney, Agent, or Firm*—Boniard I. Brown

[57] ABSTRACT

An improved multi-image film cassette holder of the type shown in my U.S. Pat. No. 4,089,019, is combined with an automatic indexing and positioning system to move the film to successive predetermined positions to record a series of images. The holder is adapted to attach to an oscilloscope camera for recording radio isotopic, ultrasonic, computerized axial tomographic, or related types of cathode-ray tube images in medical applications. The holder indexes a sheet of film orthogonally in X-Y directions in its own plane to translate it to successive predetermined positions to record a number, e.g., 4, 6, or 9, separate spaced images, which may be of a standard smaller size, such as 6×6 cm. The indexing system employs a pair of servo-motors connected to the cassette holder, preferably via flexible cable drive means. A control and logic panel or console provides for indexing on individual command, or in automatic timed sequence. The system can be retrofittered to existing manually operable cassette holders.

11 Claims, 7 Drawing Figures

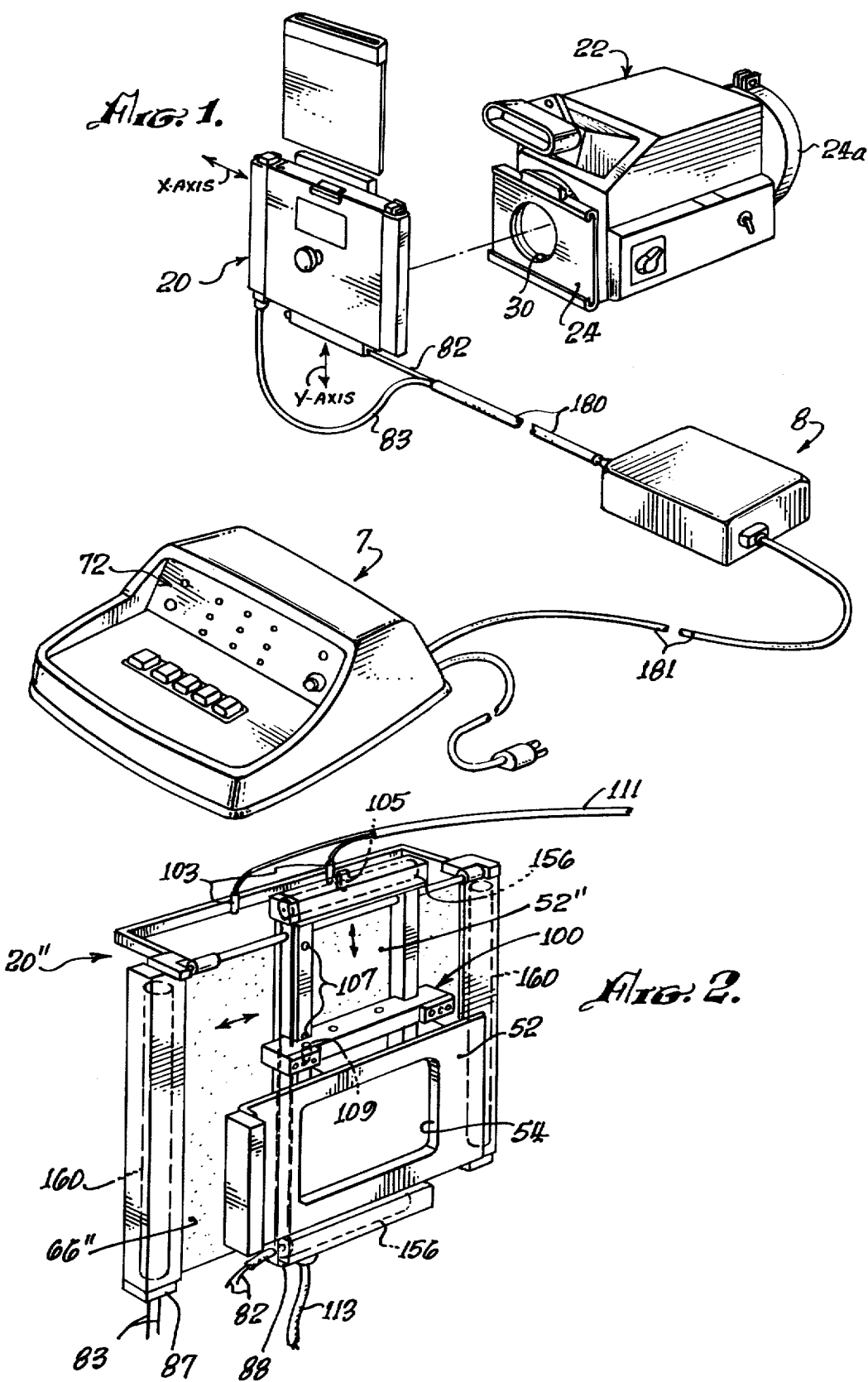

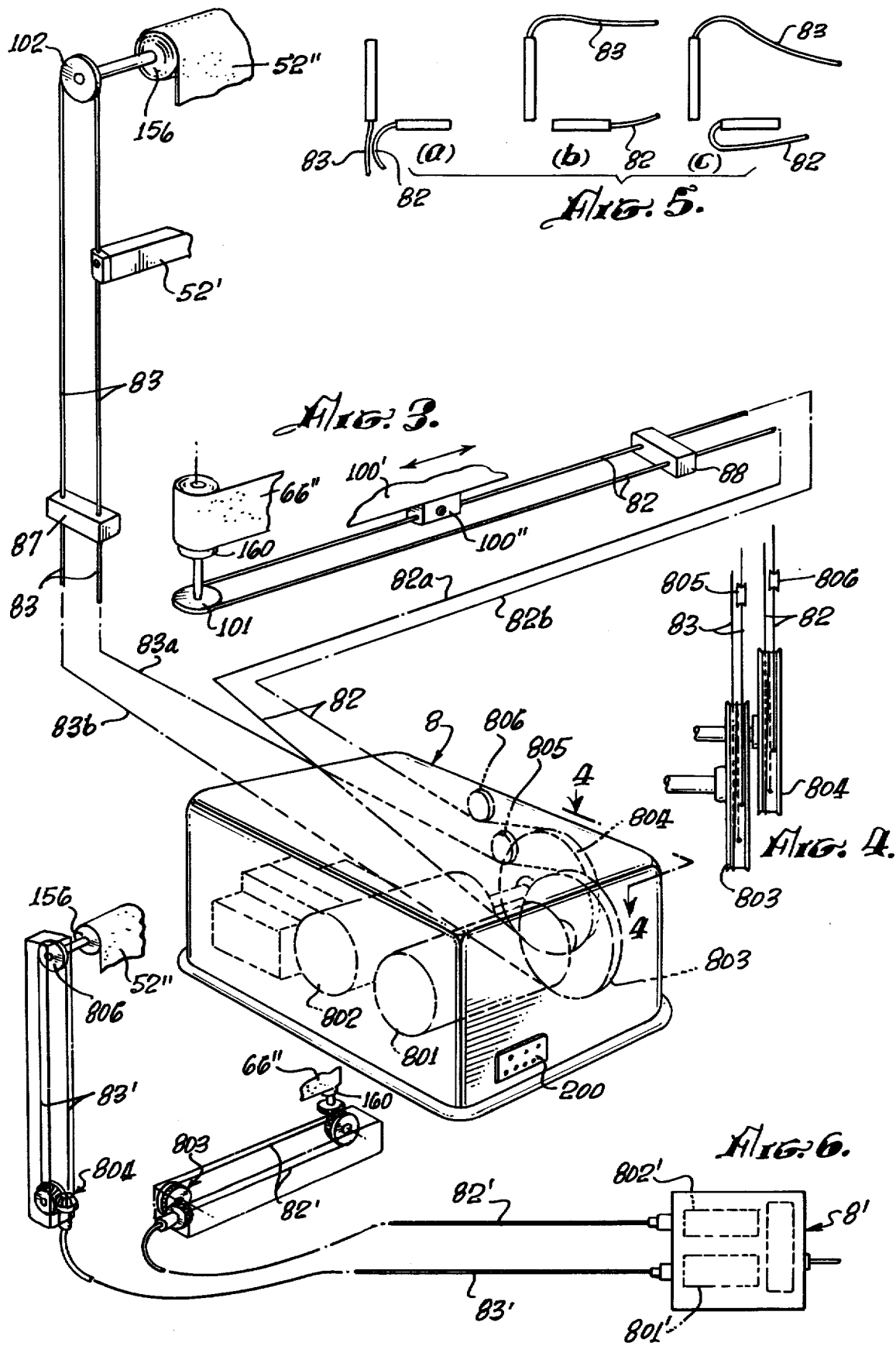

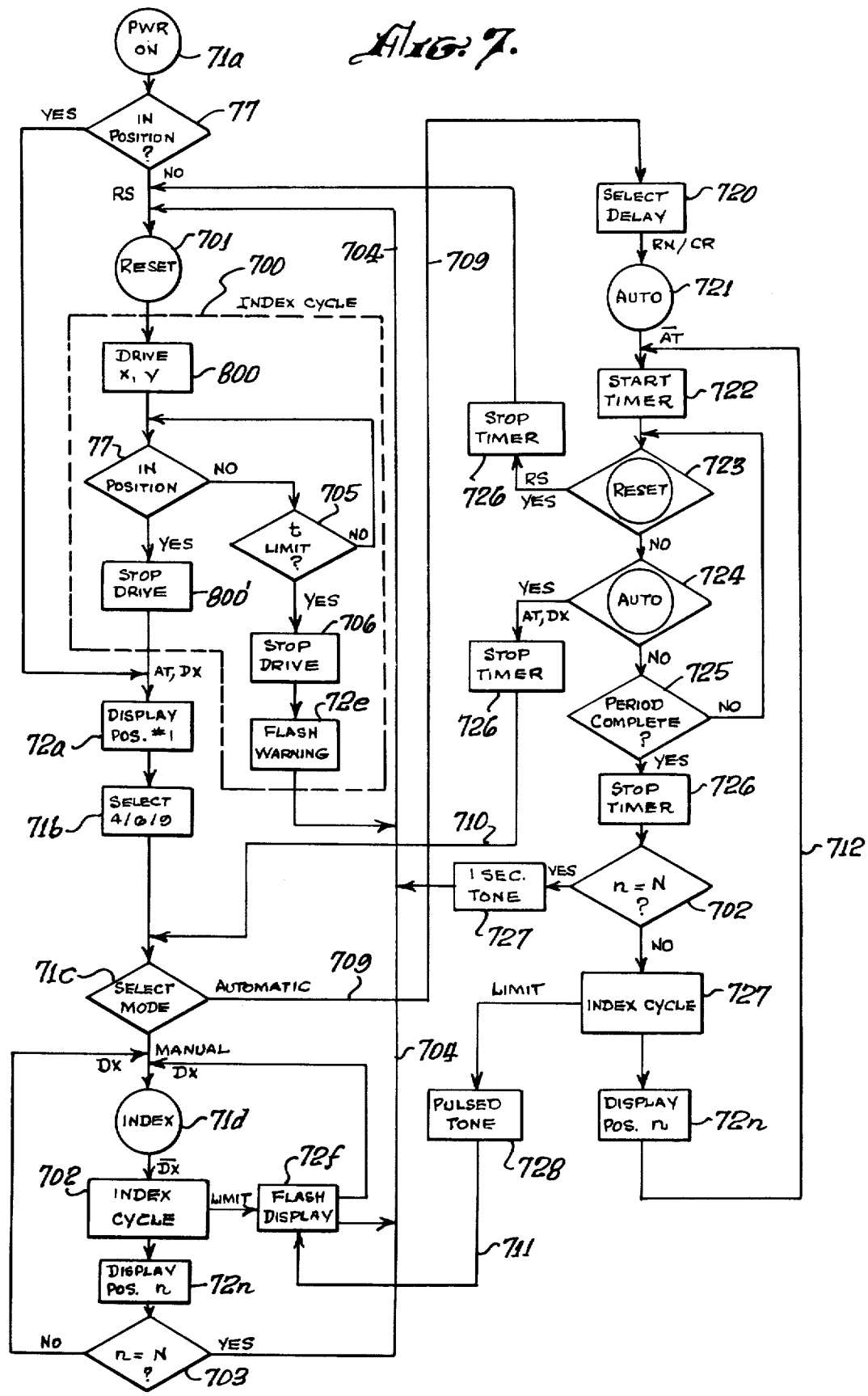

MULTI-IMAGE FILM CASSETTE HOLDER WITH AUTOMATIC POSITIONING

REFERENCE TO RELATED APPLICATION

Reference is made to my U.S. Pat. No. 4,089,019 entitled "Multi-Image Cassette Holder".

BACKGROUND OF THE INVENTION

This invention relates in general to an improved film cassette holder which includes means whereby selective portions of the film are to be exposed at different times so that multiple images are recorded on a single sheet of film. The film is typically larger than the camera back. The invention is primarily for use with imaging systems such as oscilloscope cameras which produce hard copies of soft information produced on cathode ray tubes by image formation systems used primarily in medical applications.

Various imaging systems have been used to produce images on a cathode ray tube (CRT) where it is desired to produce permanent or "hard" records of the images. Conventionally, this is done through the use of an oscilloscope camera and the addition of suitable electronics to the oscilloscope so that a large portion of the cathode ray tube is blank while the image of interest, properly sized, is produced on a specific area thereof. Later images are produced in the previously blanked areas of the CRT so that multiple images are ultimately exposed on a single photographic record. The electronics required to produce the image shifting, sizing, and blanking are relatively complex, expensive, and difficult to maintain. Such complex devices must be installed by specialized service engineers, and involved special calibration and problems of drifting from calibration. In addition CRT's have an inherent resolution limitation, so that regardless of the manner in which optical enlargement of the CRT image is accomplished before recordation on the file, lesser-resolution images as the result of sizing are the result. In some instances these disadvantages have been recognized and corrections attempted, usually by providing an extremely high resolution oscilloscope or other means which substantially increase the cost of an imaging system.

Another method commonly used to produce multiple hard images is to utilize a camera which produces one image per piece of film, such as those oscilloscope cameras produced by the Polaroid Corporation. This is disadvantageous whether or not the self-developing film produced by the Polaroid Corporation is used, since multiple pictures each having a single image thereon are always more expensive than a single larger film having multiple images. In the case of self-developing films, the desired wide variety of film sensitivity, contrast, resolution, and other characteristics is not available, so that the imaging system is not as versatile as it otherwise might be.

In a camera system for recording multiple images on a single sheet of film, a degree of automation is desirable to prevent double exposures, to identify positively and without error the different images in a sequence, and to save time, particularly in medical applications. Among the desirable features are automatic transport or positioning of the film in a predetermined sequence upon successive operation of a key or footswitch, and automatic transport or positioning of the film in timed sequence, requiring only the operation of a switch to initiate the sequence.

SUMMARY OF THE INVENTION

The manually-positioned framed film cassette holder of my above-referenced patent solves the above problems relative to image resolution, complexity and maintenance of prior CRT image-positioning and blanking electronics, cost of film, and availability of film in a wide variety of characteristics. The main mechanism for resolving these problems is a mechanical device by which it is possible to move a large film cassette relative to framing means so that only a predetermined portion of the film is exposed through a camera system at any one time. In its preferred embodiment, the cassette holder uses conventional double-sided sheet film cassettes well-known in the photographic art. The cassette with its holder is moved or translated in orthogonal X and Y directions in its own plane along labyrinth flanges which also serve as light shields. In the manual version, stops and detents limit cassette movement to a predetermined range and provide intermediate predetermined positions, so that three or more images can be recorded on a single sheet of film. The present invention provides automatic indexing and positioning for moving the film to successive predetermined positions for recording a series of images on a single sheet of film. Control circuitry housed in an appropriate console utilizes conventional electronic circuitry to control servo-motors which drive via cables to translate the cassette holder in the X and Y directions to its predetermined successive positions, in which successive positions the cassette is retained by the resistance of the system (cables, carriages, pulleys, gears, etc). The system is thus operable by means of appropriate switches or control buttons on the console panel to operate the servo-motors for the appropriate duration or number of motor revolutions to position and retain the cassette in its successive predetermined positions. In one form, position-sensing elements may be provided to sense the position of the cassette film, and are connected to control circuitry to stop the servo-motors which move the cassette in the X and Y directions.

Curtains or sliding light-blocking plates are also provided in connection with the flanges to block light entry into the camera which would otherwise enter via openings caused by movement of the cassette holder. In the present invention, flexible light-blocking plates or curtains are the preferred light-blocking means, rolled and unrolled from rollers. In a preferred form, flexible cords, driven by the servo-motors, pass around pulleys in the cassette holder. The linear portions of the cords are employed to move the film cassette in X and Y translation, and the pulleys are connected to the rollers to move the light-blocking plates or curtains in synchronism with the cassettes. The cords may preferably extend to drive pulleys in a motor housing mounted separately from the camera, extending through suitable lengths of flexible tubing. Alternatively, the cords may be restricted to the cassette holder itself, passing between spaced pairs of pulleys. One pulley of each pair may then be driven by a flexible shaft which extends to the motor box.

The console or control cabinet is interconnected with a servo-motor unit by a multi-conductor cable, and has a panel with appropriate switches and displays, such as lamps, to indicate cassette holder positions. The console or cabinet has appropriate conventional electronic systems, including logic circuitry, power supplies, etc. for providing automatic sequencing and timing of the servo-motors, interlocks, energizing of indicator displays, etc.

The objects of the present invention include the objects set forth in my above-referenced prior patent. An object of the present invention is to provide an automatic positioning and sequencing system for a film cassette holder which provides motor driven means to position the film to record images in a predetermined sequence, with means for automatic timed sequencing or for individual step-by-step indexing on command.

BRIEF DESCRIPTION OF THE DRAWINGS

FIG. 1 is a perspective view of a system utilizing the present invention, including film cassette holder, camera, servo-motor unit and control console;

FIG. 2 is a semi-diagrammatic perspective view of a cassette holder utilized with the invention;

FIG. 3 is a diagrammatic perspective view of a cable-and-pulley cassette holder positioning mechanism utilized with the invention;

FIG. 4 is an enlarged fragmentary sectional view taken at Line 4—4 in FIG. 3;

FIG. 5 is a diagrammatic illustration of alternate flexible drive cable arrangements which may be utilized with the invention;

FIG. 6 is a partial semi-diagramatic perspective showing of a modified form of holder positioning mechanism utilizing gearing; and FIG. 7 is a logic diagram of an electrical control system which may be utilized with certain forms of the invention.

Referring to FIG. 1, an automatic cassette positioning and sequencing system of the invention comprises a cassette holder 20, a servo-motor unit 8 and a control console 7. Holder 20 is shown spaced from an oscilloscope camera 22 having a suitable adapter 24 to which the holder 20 is attached for use.

The holder 20 may preferably be of the types described in my above-referenced patent and illustrated in FIGS. 14 through 18 of that patent. For convenience of reference, components and features common to the devices of the present invention and that patent are identified by corresponding reference numerals where practicable.

The present invention provides mechanical transport, positioning, or indexing mechanisms driven via flexible drive means from motors in the external servo-motor unit 8. The servo-motor unit 8 of FIG. 1 contains two servo-motors driving flexible drive elements 82, 83, which are coupled to the holder 20 to drive the film cassette in the X and Y directions via the positioning mechanism. Shown encased for part of their length in a single flexible tubular housing 180 in FIG. 1, these drive elements may either be flexible shafts or cord-like cables run in pairs in individual flexible tubes.

FIG. 1 shows an oscilloscope camera 22 with a film cassette holder adapter 24 having an image opening 30 at its back. The front end of camera 22 has a suitable fitting 24a at its front end to fit over a cathode-ray bezel. Camera 22 may be of any suitable commercial type, and is not a part of the invention.

Motor unit 8 is controlled by a console or control box 7 having a panel 72 and housing suitable switching, power supply, and logic circuits. It controls the servo-motors via a suitable multi-conductor cable 181. The front panel 72 may typically mount a main power switch, switch means to select semi-automatic or full-automatic modes of operation, switch means to select a desired number of images, indicator lamps to display the position occupied by the film cassette, and visual or audible means to indicate when the cassette is not in the position selected or that it is in the last position of a sequence.

FIG. 2 shows one form of drive mechanism installed in a film cassette holder 20". To exclude light from those parts of the film not in the image opening, it employs a pair of orthogonally-movable flexible "plates" or curtains 52", 66" on rollers 156, 160 which roll and unroll like the curtain in a focal-plane shutter. The flexible plates or curtains are thus moved in a plane parallel to the film plane so that, as the film cassette moves to its various positions, the light impinging on the film is restricted to that entering through the image opening 54 in plate or mask 52. The film cassette is attached to plate 52, but is omitted from FIG. 2 for clarity of illustration.

Plate 52 is part of an assembly 100 in which it can slide upwardly and downwardly, driven by flexible cords or cables 83 which extend up, over, and back down from a pulley 102, providing positioning in the Y-direction.

Assembly 100 is itself movable horizontally in the X-direction in similar fashion, driven by cable 82 which passes horizontally to extend about a pulley 101.

FIG. 3 shows diagrammatically the same cable mechanism, with the cassette holder structure omitted for clarity of illustration. Two servo-motors 801, 802, are preferably slow-speed motors, and have drive pulleys or sheaves 803, 804 about which the drive cables 82, 83 extend. Tensioning idler pulleys are preferably provided at 805, 806. The continuous cable or cord 82 extends as shown at 82a, 82b, passing through a guide yoke 88 on the cassette holder and about the pulley 101. It is thus disposed to translate the carriage 100 back and forth. A small portion of carriage 100 is indicated in 100', attached to the cord portion 82b by a suitable fitting 100".

Similarly, the vertical Y-direction drive employs cable 83 passing through guide yoke 87 and over pulley 102 to move the plate 52 vertically along the Y-axis. Both these linear drives function in the manner of a "slide rule" dial on a radio. Concurrently with this X-Y motion, the pulleys 101, 102 rotate the rollers 160, 160' to move the flexible plates or curtains 52", 66" orthogonally in the manner described above.

FIG. 4 is a detail top view of the drive pulleys 803, 804 on the servo-motors 801, 802, with idlers 805, 806 and the drive cords or cables 82, 83. Each of the drive cords extends continuously from the drive pulleys or sheaves to respective pulleys 101, 102 on the cassette holder and back. Between the motor box and the cassette holder 20 (FIG. 1) the drive cords run through flexible tubular housings—i.e., the pair of portions 82a, 82b are thus individually enclosed and the pair 83a, 83b are in another similar housing.

FIG. 6 shows a modification of a drive mechanism in which the motion from servo-motors 8', 801' and 802', drives rotary flexible shafts 82', 83', which operate like conventional vehicle speedometer cables. At the film cassette holder 20, each shaft drives a bevel gear pair to drive a pulley. Thus a gear at 804, FIG. 6, drives a drive pulley which drives a short loop of cord or cable 83' which passes over another pulley 806, which in turn drives the roller and the curtain or flexible plate 52". The horizontal drive, with cable 82', operates similarly.

FIGS. 5, 5(a), 5(b) and 5(c) illustrate diagrammatically different positions or dispositions at which the flexible drive means may be attached to the cassette holder of the invention. To accommodate the arrangement of controls, accessories, and other structure about a particular type of camera 22, the vertical drive cable 83 may be connected either at the top or the bottom, and the horizontal drive means at either the right or left.

It will be understood from the foregoing that the console circuitry programs, controls and stops operation of the servo-motors to move, position and stop the cassette holder in its successive predetermined positions. The cassette holder is held and retained in each of its successive positions by the then stationary condition of the positioning mechanism, including the cables, pulleys or gears, etc.

A system may also be provided with position sensors for sensing when a cassette is in a selected predetermined position, such sensors being electrically interconnected to de-energize the servo-motors to stop movement. Such sensors are indicated in FIG. 2 as reed switches 103 which are closed by proximity of a magnet 105 on the cassette holder, and by reed switches 107 which are activated by magnet 109 on the holder. Switches 103 provide electrical signals via cable 111 to effect stopping of the horizontal drive servo-motor, and reed sketches provide signals via cable 113 to effect stopping of the vertical-drive servo-motor.

A suitable control system for the console or control box 7 has its schematic logic diagram shown in FIG. 7. This system may be implemented by means of components and techniques known in the art of electronic digital logic design, and is therefore not described in detail. The components indicated in FIG. 7, such as logic gates, oscillator, amplifiers and counters are indicated by three-digit reference numerals. The system is operated from switches on the panel 72 of the console, thus to operate the servo-motors and display information.

When the power is turned on by switch 71a, FIG. 7, sensor indicator 77 signals whether or not the holder is in position No. 1 of a predetermined sequence. If so, position display 72a lights up. The operator may then select the desired number of holder positions, such as 4, 6, or 9, by means of a panel switch 71b.

Another panel switch 71c selects either the semi-automatic mode or the full automatic mode of operation. If semi-automatic, the operator actuates a panel pushbutton or a foot switch 71d each time it is desired to move the film cassette to the next position in the sequence, thus to actuate index cycling circuitry 702. At the end of the cycle, displays 72f and 72n are energized. A logic element 703 compares the actual position n of the cassette holder with the position N into which it should have been moved. If "Yes", the reset block 701 is actuated via a bus 704; if "No", an index cycle is repeated.

Referring to logic block 77 (which may be a contact), if the answer to "in position?" is "No", a position-change timing element 705 prevents the "in position" indicator 77 from initiating the "stop drive" element 800'. If the assigned time interval passes without the repositioning becoming completed, logic element 706 actuates a "Flash Warning" indicator 72e and actuates the reset switch indicator 701.

Full automatic operation, selectable by switch 71c, utilizes the functions 720-728 indicated on the right-hand portion of FIG. 7. An interval timer, not shown, causes the cassette holder to be moved to successive preselected positions in a predetermined sequence at a preselected rate. Bus 709 from mode selector 71c goes to a timer 720 with selectable delay. "Auto" switch 721 is operated to start the sequence. The timer is started at 722; at the time period is checked, and if "No", the cycle continues. If "yes", the timer is stopped at 726. The actual position of the cassette, identified by a position number n, is checked at 726 against the desired number N. If they agree, the cycle is reset via a bus 704 and a suitable audible tone signal generated at 727. If the number check is "No", the index cycle continues, position indicator 72n is actuated, and a signal via bus 712 causes the timer to restart.

While the invention has been disclosed in connection with certain physical embodiments thereof, it will be recognized by those versed in the art that various modifications of the invention are possible within the spirit and scope of the following claims.

The inventors claim:

1. A film cassette holder for a camera with a back image opening of predetermined size, comprising:
 a film cassette adapted to hold a flat sheet of film at least twice the size of said image opening,
 positioning means to move said cassette in translation to position different portions of said film over said image opening to record successively a plurality of images on said film,
 light-excluding means comprising: rollers, a flexible opaque curtain over the film, and said curtain defining a curtain opening and being mounted on said rollers, and
 roller drive means driving said rollers in synchronism with said cassette positioning means to maintain said curtain opening in registration with said image opening to exclude light from said film except at said image opening,
 said positioning means comprising a flexible cord extending about a pulley and a mechanical connection from said cassette to the cord to move said cassette in translation, a first plate, a slidable connection along a Y-axis between said cassette and said first plate, and a second plate and a slidable connection along an X-axis between said first and second plates, whereby said cassette is positionable along X and Y coordinates, said roller drive means comprising shaft means connecting said pulley rotatably to a roller, and said light-excluding means comprising a first opaque curtain on rollers on said first plate and a second opaque curtain on rollers on said second plate, said holder further having a pair of positioning motors in a motor box, and flexible drive means extending from said motors to said cassette holder to actuate said cords.

2. A film cassette holder according to claim 1, wherein:
 said flexible drive means comprises a flexible tubular housing enclosing a said cord.

3. A film cassette holder according to claim 1, wherein:
 said flexible drive means comprises a flexible shaft, and further comprising cassette holder drive pulley means on said cassette holder, and a rotary connection from said flexible shaft to said drive pulley means.

4. A film cassette holder system according to claim 1, and further comprising:

a control system in a control box and electrical cable means interconnecting the control box and said motors, means in said control system to actuate said positioning means in a predetermined selectable sequence, means in said control system to actuate and to stop said motors to place said cassette in selected respective predetermined positions, and display means to indicate which said position the cassette is occupying.

5. A film cassette holder system according to claim 1, and further comprising:

position sensors to sense electrically the position of said cassette, a control system in a control box and electrical cable means interconnecting the control box and said motors, means in said control system to actuate said positioning means in a predetermined selectable sequence, means in said control system to actuate and to stop said motors in response to signals from said sensors to place said cassette in a selected respective predetermined positions, and display means to indicate which said position the cassette is occupying.

6. A file cassette holder for a camera with a back image opening of predetermined size, comprising:

a film cassette adapted to hold a flat sheet of film at least twice the size of said image opening, positioning means to move said cassette in translation to position at least first and second different portions of said film over said image opening to record successively a plurality of images on said film, said positioning means including a first direction electric drive motor operatively connected thereto, and control means therefor, said control means including a first sensor for sensing the position of said cassette in said first direction, motor control means, a start control, reset means connected between said first sensor and said motor control means which cause said motor control to drive said cassette to said first position after said start control is actuated and annunciator means to indicate the position of said cassette, light-excluding means comprising a flexible opaque curtain over the film, said opaque curtain defining a curtain opening, and rollers on which said opaque curtain is mounted, and roller drive means driving said rollers in synchronism with said cassette positioning means to maintain said curtain opening in registration with said image opening to exclude light from said film except at said image opening.

7. A film cassette holder according to claim 6, and further comprising a timer control connected to said motor control means to actuate said motor control means at predetermined intervals.

8. A film cassette holder according to claim 7, and further comprising a warning annunciator connected to said timer control and said first sensor to annunciate a warning when a predetermined interval of time has past and said cassette has not repositioned.

9. A film cassette holder according to claim 6, and further comprising:

a second direction electric drive motor connected to drive said cassette at a second direction 90° to said first direction electric drive motor; and a second sensor for sensing the position of said cassette in said second direction, said reset means also being connected between said second sensor and said motor central means.

10. A file cassette holder for a camera with a back image opening of predetermined size, comprising:

a film cassette adapted to hold a flat sheet of film at least twice the size of said image opening, positioning means to move said cassette in translation to position different portions to said film over said image opening to record successively a plurality of images on said film, light-excluding means comprising: a flexible opaque curtain over the film and rollers, said opaque curtain defining a curtain opening and being mounted on said rollers, roller drive means driving said rollers in synchronism with said cassette positioning means to maintain said curtain opening in registration with said image opening to exclude light from said film except at said image opening, said roller drive means including a pair of positioning motors in a motor box and drive means extending from said motors to said rollers, a control system in a control box and electrical cable means interconnecting the control box and said motors, means in said control system to actuate said positioning means in a predetermined selectable sequence, means in said control system to actuate and to stop said motors to place said cassette in selected respective predetermined positions, and display means to indicate which said position the cassette is occupying.

11. A film cassette holder system according to claim 10, and further comprising:

position sensors to sense electrically the position of said cassette, a control system in a control box and electrical cable means interconnecting the control box and said motors, means in said control system to actuate said positioning means in a predetermined selectable sequence, means in said control system to actuate and to stop said motors in response to signals from said sensors to place said cassette in a selected respective predetermined positions, and display means to indicate which said position the cassette is occupying.

* * * * *